FIG. 1

INVENTOR.
AL U. SHARON
ATTORNEYS

July 22, 1969  AL U. SHARON  3,457,371

DATAPHONE DRIVEN REMOTE GRAPHIC DISPLAY SYSTEM

Filed Dec. 27, 1965  6 Sheets-Sheet 5

INVENTOR.
AL U. SHARON

ATTORNEYS

FIG. 5C

United States Patent Office 3,457,371
Patented July 22, 1969

3,457,371
DATAPHONE DRIVEN REMOTE GRAPHIC DISPLAY SYSTEM
Al U. Sharon, Penfield, N.Y., assignor to Xerox Corporation, Rochester, N.Y., a corporation of New York
Filed Dec. 27, 1965, Ser. No. 516,657
Int. Cl. H04n *3/16;* H04m *11/00;* G11b *13/00*
U.S. Cl. 179—2      7 Claims

ABSTRACT OF THE DISCLOSURE

A display system including a cathode ray tube which is utilized as a light writing source for a sensitized xerographic plate and further including electronic circuitry suitable for composing any type of graphic information, the system operation being such as to result in the production at the CRT face of a vector point of light which traces a curve digitally directed by the computer. The xerographic plate effectively retains the single real time CRT image in the form of a latent electrostatic image which is thereafter developed and PROXI projected onto a display screen.

---

This invention relates generally to graphic display systems and more specifically to systems of this class capable of receiving information from a remote digital computer.

In today's modern and complex society, computers have come to permeate more and more areas of our everyday life. Whereas the services of computers were once considered to be a luxury available only to huge technological complexes it is today commonplace to find these machines at work in virtually all phases of commerce, industry, and agriculture. Yet, while the use of computers has become accepted practice in even relatively small operations, the limited user nevertheless continues to be beset with problems of how to best secure the services he so urgently needs within the equally limited resources likely available to him.

It is in the foregoing context that the system presently to be described has its fullest application. For the central achievement of the present system is such as to provide simple means for remote users thereof to obtain economically, refined graphic display originated by a sophisticated centralized computer. More specifically, the graphic information in the present instance is received over ordinary telephone lines and via a standard dataphone, thus adapting the system to the needs of any user within reach of a telephone. The system is furthermore so designed that the most complex graphic displays including mathematical curves and line drawings may be transmitted and displayed with ease.

It is thus an object of the present invention to provide a graphic display system capable of displaying graphic material of any variety whatsoever, and at the direction of a digital computer.

It is furthermore an object of the present invention to provide a graphic display system capable of receiving information from a remote digital computer via ordinary telephone lines and a conventional dataphone interface.

It is also an object of the present invention to provide a graphic display system which requires a simple computer program to generate its plotting information, and a minimal amount of data transfer from the computer to the display thereby providing a display system ideally adapted for coupling via slow transmission media—such as telephone lines—where minimization of data is necessary.

It is yet an additional object of the present invention to provide a data display system in which real time display of graphic materials is brought about at the direction of a remote digital computer, and upon a medium essentially constituting an electronic blackboard.

In the present invention these and other objects are achieved by means of a dataphone-linked display system, including a cathode ray tube which in a preferred embodiment is utilized—in conjunction with suitable optics—as a light writing source for a sensitized xerographic plate. This plate effectively retains the single real-time CRT image in the form of a latent electrostatic image. Upon completion of the graphical display the latent electrostatic image is automatically developed and projected onto a display screen.

In the present system the remote central computer directly communicates with a portion of the system hereinafter designated as the vector-plotter. The circuitry is such as to result in production at the CRT face of a vectored point of light which traces the curve digitally directed by the computer. More specifically, the light spot itself traces its real time path upon the sensitized xerographic plate, the resulting latent image being thereafter developed and rendered visible to the viewer as a projected bright display.

A more complete understanding of the present invention, of its numerous advantages, and of the manner in which the invention acts to attain the several objects previously recited and other objects not explicitly indicated, may now best be gained by a reading of the following detailed specification together with an examination of the drawings appended hereto in which:

In the description that follows, certain parameters will frequently be assigned to data being manipulated by the display system. Thus, for example, a word may be referred to as comprising a specific number of bits, and so forth. In all instances such as these, it is to be understood that the parameters cited are intended merely to concretely illustrate operation of the system and are not in any way intended to delimit the invention otherwise described.

Figure 1:
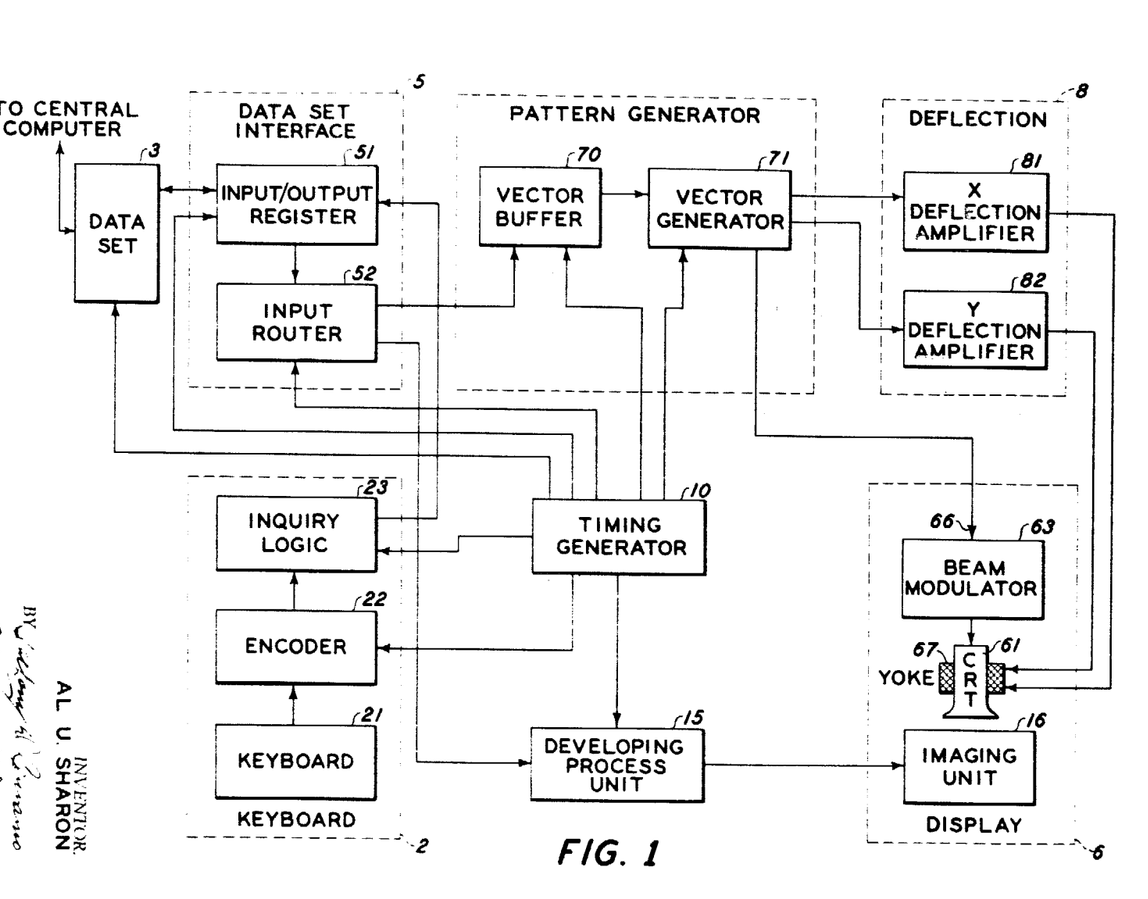
FIGURE 1 is an electronics block diagram for the overall remote display system.

In the electronics block diagram depicted in FIGURE 1 a conventional timing generator at 10 supplies proper timing pulses to all digital sub-systems. Digitally encoded data is fed from a central computer via the standard data set 3. The latter instrument is a commercially available item commonly employed—as in the present application—as a terminal interface in the transmission of binary encoded data. Essentially the instrument performs as a buffer amplifier, and accomplishes isolation, power amplification, and impedance matching. A suitable instrument of this type is, for example, available from the Bell System under the designation "Model 201A Data Set." For purposes of the present discussion it may be assumed that the data input rate through the data set is 2,000 bits per second NRZ (non return to zero). This is a figure fully compatible with the capabilities of the usual telephone transmission lines.

The data set interface section of the present system is generally indicated in FIGURE 1 by the numeral 5. This portion of the present system consists principally of input-output registers as at 51, and the input router 52. In addition, conventional timing circuits, including a stable oscillator, electronic counters, and associated logic, are present within the interface section of the system. These latter elements are not explicitly indicated in view of the fact that the use of such clocking techniques to time data in and out of the registers is a technique commonplace and well understood by those skilled in the art of digital data manipulation. In a general sense, synchronization between the display system and the data set is achieved in the present instance by slaving the data set timing to the display system timing generator or vice-versa, it being understood that the precise manner in which this is brought about will vary somewhat depending upon the precise data set actually utilized in conjunction with the display system.

Encoded inquiry data is generated within the keyboard section 2 of the present system by manual activation of the keyboard 21. From the encoder 22 these characters are transferred to the inquiry logic at 23 which gates this inquiry data to the input-output register 51, thence to the data set 3, and ultimately to the central computer. The computer will respond when ready with the requested data to the display system.

For purposes of illustrating the system operation this computer furnished data may be considered as generally made up of successive 10-bit words. In an illustrative case the requested data is preceded by a 10-bit routing word. This first word is decoded by the input router 52 and indicates by its code whether the succeeding data should be routed directly through the vector buffer 70 and thence to the vector generator at 71 or to the developing process unit 15. The input router 52 also generates the required mode signals to enable the display system function.

In the present system vector plotting is initiated upon the detection of an appropriately encoded word by the input router 52. Data thereafter follows the path from the input router 52 through the vector buffer stage 70, the controlling vector generator 71 and the deflection circuitry generally designated at 8. The latter, in turn, effects the line display formed at display section 6.

Figure 2:
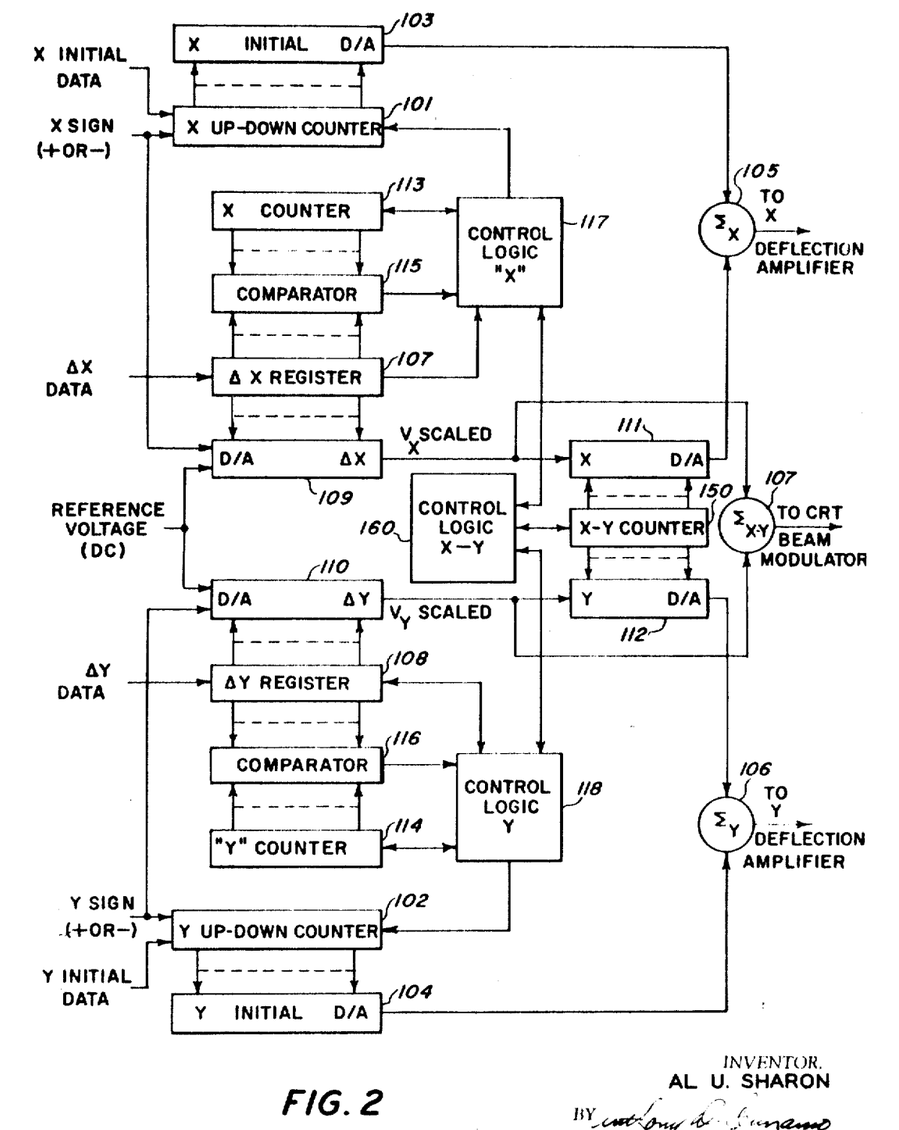
FIGURE 2 illustrates indetailed block form the elements and mode of operation of the vector-plotter portion of the present system.

The operation of the vector generator 71 is shown in much greater detail in the block diagram of FIGURE 2. Assuming then that the vector plotting mode of operation has been initiated, it may be assumed that two words are initially entered—indicated in FIGURE 2 as "X initial data" and "Y initial data"—which represent the initial beam position with respect to a reference point on the CRT 61 face. During this initial positioning the CRT beam remains blanked with no trace drawn upon the CRT face. Subsequent words transmitted from the computer will represent the binary value of an increment $\Delta X$, or $\Delta Y$ by which the beam must be deflected in each direction to reach a new position $(X+\Delta X; Y+\Delta Y)$. Since the beam motion is effected by both the $\Delta X$ and $\Delta Y$ quantities, it resolves a line which is the vectorial representation of the two quantities.

Initial positioning data is entered into either the X or Y up-down counter, indicated respectively at 101 and 102. The contents of each up-down counter undergoes digital to analog conversion in parallel at 103 or 104 respectively, and is thereafter fed through the X or Y summing networks at 105 or 106 to the appropriate X or Y deflection amplifier. When a quantity $\Delta X$ or $\Delta Y$ arrives from the computer with the appropriate positive or negative sign, it is entered into the $\Delta X$ or $\Delta Y$ registers at 107 and 108 respectively. The contents of these registers are thereafter digital to analog converted in parallel at 109 and 110.

Figure 4:
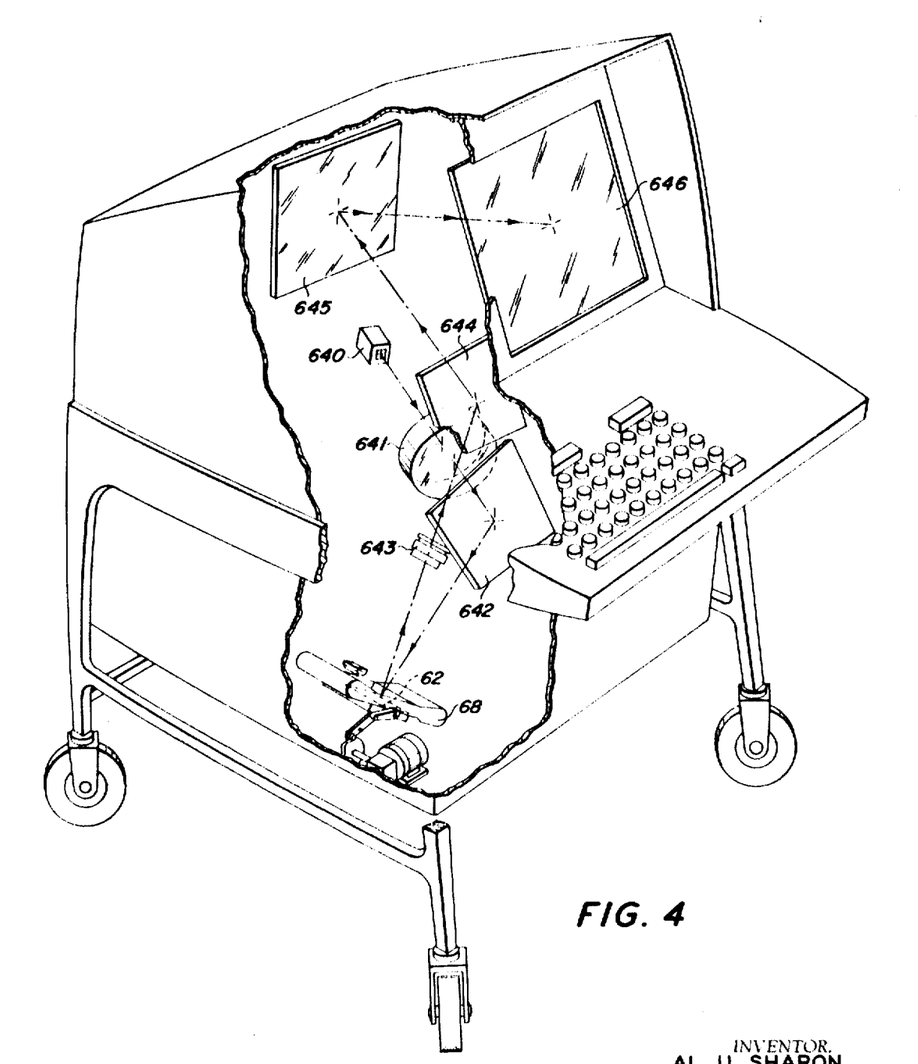
FIGURE 4 is a pictorial partially sectional view of the projection optics of the present system.

The outputs of the D/A (digital to analog) converters at 109 and 110 are thereafter used as variable reference voltages for a second set of digital to analog converters denoted in FIGURE 4 as "X D/A" and "Y D/A" at 111 and 112, respectively. This latter set of D/A converters are connected in parallel to an 8-bit X—Y counter 150. The X—Y counter 150 is initiated after both $\Delta X$ and $\Delta Y$ words have been entered into the $\Delta X$ and $\Delta Y$ registers at 107 and 108 respectively. The outputs of the X and Y D/A converters at 111 and 112 are thus increased by one increment for every count of the X—Y counter 150. Since, however, the reference voltage used by these D to A converters is scaled by $\Delta X$ or $\Delta Y$, the change in voltage for every incremental change in X or Y will be directly proportional to the magnitude of the received $\Delta X$ or $\Delta Y$. The outputs of converters 111 and 112 are then summed with the appropriate X-initial or Y-initial digital to analog converter outputs originating at converters 103 and 104, throughout the period of beam writing.

After completion of the 255th count of the 8 bit X—Y counter 150, the beam is blanked and the X counter and Y counter at 113 and 114 respectively are activated. The X up-down counter at 101 or Y up-down counter at 102 count in accordance with the X or Y sign ($\mp$), for as long as the respective X or Y counters at 113 and 114 are counting. The status of each of the X and Y counters is continuously compared by bit comparators at 115 and 116 to the respective $\Delta X$ or $\Delta Y$ registers at 107 or 108. When comparison is detected (independently for X and Y), the counting of the associated X or Y counter and up-down counter is stopped and the $\Delta X$ (or $\Delta Y$) counters are cleared. At this point in time the contents of the $\Delta X$ and $\Delta Y$ registers have been added to or subtracted from the contents of the X-initial and Y-initial positions maintained by the X and Y up-down counters at 101 and 102. The beam can now be moved by a new $\Delta X$ and/or $\Delta Y$ quantity or remain unmoved for an unlimited time without loss of positioning accuracy since its position is held in a digital form. All logic functions for the operations described are—as shown in FIGURE 2—performed within control logic at 117 for X, at 118 for Y, or in the case of counter 150, within the X—Y control logic at 160. The latter also is seen to coordinate the former two in the interacting operations that have been described.

While the vector plotter implementation has been particularly described for a situation wherein the X—Y counter at 150 is organized on an 8-bit basis, it will be apparent to those skilled in the art that in a more general form the counter 150 could be organized on any $n$-bit basis. In such a generalized case the output of the D/A converters at 111 and 112 would be increased in $2^n-1$ increments. Since the $\Delta X$ and $\Delta Y$ quantities are thus incremented by the same number of pulses in each $$\frac{1}{2^n-1}$$

part of the CRT trace period, successive small increments of the desired line are drawn by the beam. And each such segment of the displayed line retains the exact slope of the line since it contains exactly $$\frac{1}{2^n-1}$$

of $\Delta X$ and $\Delta Y$ quantities. The displayed line will therefore appear continuous and unbroken.

In the configuration described thus far the CRT beam rate of displacement speed depends upon the magnitude of the vector traced; that is to say, the longer the vector, the faster the beam must be moved. Since the beam, however, must be bright enough to be visible or recordable at maximum speed (for maximum $\Delta X$ and $\Delta Y$ values), it follows that when a low value $\Delta X$ and $\Delta Y$ line—that is to say a short line—is drawn, the beam speed will be low and the brightness of the trace on the display will be inversely related. To prevent such a large change in display brightness intensity, the voltages from the converters 109 and 110—which are designated in FIGURE 4 as "$V_x$ scaled" and "$V_y$ scaled" are added by a summing network at 170. The output of this network is used—as indicated in the figure—to modulate the CRT beam, whereby the beam intensity will be directly related to the magnitude of the quantity $(\Delta X+\Delta Y)$. The increased beam intensity for high values of $(\Delta X+\Delta Y)$ will therefore compensate for the tendency of decreased trace brightness for high values of ΔX and ΔY. It may be noted in this respect that the length of the line which has ΔX and ΔY as its components is $[(\Delta X)^2 + (\Delta Y)^2]^{1/2}$ a result which is different from the beam modulation factor of $(\Delta X + \Delta Y)$. However, the ratio $$\frac{\Delta X + \Delta Y}{[(\Delta X)^2 + (\Delta Y)^2]^{1/2}}$$

varies between 1 and 2 only, and can be easily tolerated.

Figure 3:
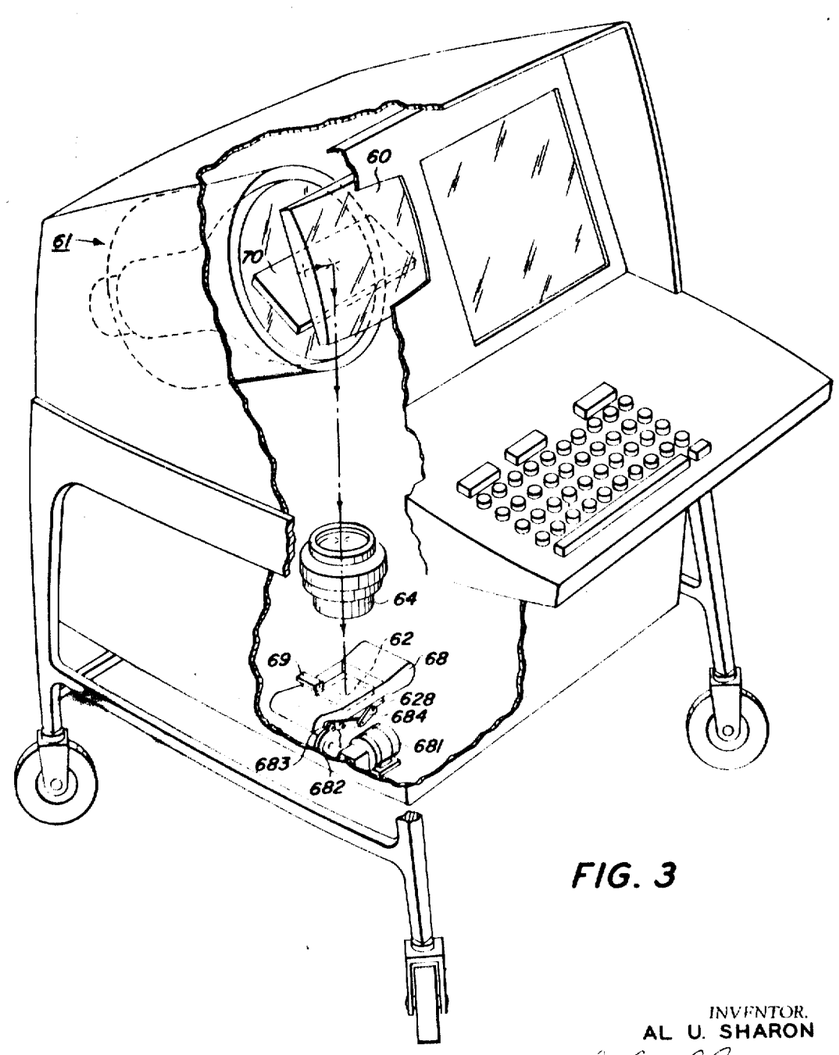
FIGURE 3 is a pictorial partially sectional view of the imaging optics of the present system.

The display section of the present system has been referred to throughout the foregoing description. Generally speaking, this portion of the system is designated in FIGURE 1 at 6 and includes the cathode ray tube 61, beam modulator means generally designated at 63, and in the embodiment illustrated, the imaging unit at 16. The latter includes the various optical components, the photoreceptor, light source, developing means, etc., all elements of which will be fully elucidated in what follows. A pictorial representation of the arrangement of the several parts with respect to the overall device is shown in FIGURES 3 and 4. The former shows the orientation of the several components during the imaging cycle and the latter indicates the orientation of the components during the projection step. FIGURE 5 will be found to illustrate in considerable detail the development cassette 68 incorporating the xerographic plate which has been previously referred to in this specification.

Referring to FIGURE 3 the cathode ray tube utilized in the present system appears generally at 61. In a typical instance, the CRT is a 9 inch diameter flat faced unit utilizing a P–7 phosphor, low angle magnetic deflection and electrostatic focus. With a diameter tube as indicated the useful area on the CRT may suitably comprise a 5.35 inch by 5.35 inch square in the sense that this square area will be used for projection of the stored image onto the xerographic plate 62 for later viewing by the operator.

The P–7 phosphor previously alluded to is a designation for a partcular phosphor type, the identification "P–7" being made in accord with the standards of the Electronic Industries Association. The phosphor selection is based on the performance of two display functions. First—as will subsequently be demonstrated—provision is made in the present system for an operator to directly view the writing CRT beam as it advances on the CRT face. Accordingly a long persistence phosphor is useful in minimizing flicker during such direct viewing. Secondly, the CRT must be principally used as the source for full frame exposure of the data to be stored on the xerographic plate. As the plate will commonly have for its light sensitive element a photoconductive layer of selenium, the plate will have its maximum sensitivity in the blue light region of spectrum. Hence, the CRT image should desirably be rich in blue light. Both of the aforementioned requirements can be satisfied by the use of the P–7 phosphor which has two major spectral peaks—one in the yellow region of the spectrum and one in the blue region.

With a phosphor of the above mentioned type, the yellow component has a decay time of approximately one second to the 10% amplitude point, and the blue a decay time of approximately 50 microseconds to 10% amplitude. Because of this difference in decay times for the two peaks, it may in fact be desirable in the present system to utilize a yellow filter in the segment of the display used for direct viewing to diminish flicker by eliminating the comparatively rapid blue flashing that would otherwise be superimposed on the yellow pattern appearing at the CRT face. Similarly, it may be desirable to place a blue filter in the optical path between the CRT face and the photoconductor in order to eliminate the long persistence yellow component. The use of yellow and blue filters as mentioned may be desirable too, in that their insertion into the optical path specified assists in blocking room light from the xeragraphic plate.

The CRT beam modulator at 63 (FIG. 1) receives analog signals through the input identified at 66. This analog signal, which originates at the vector generator 71 portion of the system, operates (as has been previously discussed) to modulate the intensity of the beam through a standard video amplifier contained within 63.

The deflection amplifiers 81 and 82 are desirably direct-coupled feed-back amplifiers. They provide a low impedance drive to the deflection yoke 67 for the accurate positioning of the electron beam. The deflection yoke 67 used in conjunction with the CRT is a standard unit and typically is a single ended unit of flat field characteristics exhibiting a spot recovery time of the order of four microseconds.

A feature of the present system is the image storage means represented by the xerographic plate 62, together with the associated optics, generally designated in FIGURE 3 at 64. These image storage means are such as to allow information displayed on the CRT to be written in real time on the xerographic plate and thereafter retained indefinitely or until the operator initiates further display. It is siginificant to appreciate that because of the image display technique utilized no further regeneration or action by the electronic sub-system is required during the image display period. And yet when the operator desires, the system can be prepared for reimaging from the CRT in a time period less than 2 seconds.

Referring again to the pictorial representation of FIGURE 3, the display portion of the system is seen to include the CRT generally designated at 61, the lens system 64, and the xerographic plate at 62 which is a portion of the more generalized development cassette at 68. The cassette 68 is in turn frictionally held in a rockably mounted frame 628. Further details of this cassette and frame will be discussed in connection with FIGURE 5. Corona charging means are provided at 69 to sensitize the plate 62.

These charging means are positioned so as not to interfere with the light spot traversing the sensitized plate during the write mode.

In the present system, the operator may view—at his option—the CRT face through a virtual image viewer 60. While the image produced on xerographic plate 62 during the writing period is intended primarily for stored viewing it will be evident that a transient—yet in relative terms persistent image will appear at the CRT face even during this perod and may be of at least passing interest to the operator. Accordingly the dichroic mirror 70 is positioned to permit the viewer to follow the progress of the beam during the write mode. More specifically, the dichroic mirror 70 will reflect the blue light component of the CRT trace to xerographic plate 62 while simultaneously transmitting the yellow light component to the viewer.

The display portion 6 of the present system utilizes a xerographic process called PROXI (projection by reflection optics of xerographic images). The general principles of PROXI display have been described in numerous places, including the patent application of Harold E. Clark and George R. Mott bearing Ser. No. 343,183 filed Feb. 3, 1964, now abandoned, entitled "Image Projection" and assigned to the same assignee as the present application. A similar system has also been described on page 382 f.f of "Xerography and Related Processes," edited by John H. Dessauer and Harold E. Clark (The Focal Press, London and New York, 1965). Briefly, this system operates in the following manner: A photoconductive surface (xerographic plate 62) is charged and exposed to produce a latent electrostatic image. Where the light strikes the charged photoconductive surface the conductivity is varied locally depending on the exposure provided by incident radiation. This variation of conductivity selectively discharges the photoconductive surface to produce a latent electrostatic image which is a replica of the incident radiation pattern. A developer which consists of triboelectrically charged toner particles and carrier beads is cascaded over the xerographic plate and the toner adheres to the latent electrostatic image thereby producing a physical image.

In the generalized PROXI system the developed toner image is projected optically onto the display screen. In achieving projection advantage is taken of the fact that areas of the developed image in which the toner has adhered scatter or absorb light, while toner-free areas reflect light specularly—that is in a well-defined direction. The developed image area is therefore illuminated with well columnated light at an oblique angle of incidence, and optics are positioned to collect light at an equal angle of reflection. For those areas which are void of toner particles the amount of light collected is a function of the collimation of the illuminating beam and the aperture of the collecting optics. For areas which contain toner, however, and hence produce diffuse reflection, the amount of light collected is a function of the aperture of the collecting optics only. The relative light intensity from clear and toned areas (contrast ratio) is then solely a function of the optical design.

In the image display portion of the present system a cassette type PROXI image forming sub-system is utilized. The cassette system is generally shown at 68 in FIGURE 3 and in much greater detail in FIGURE 5. The latter figure—in part (A) thereof—shows the cassette to comprise a closed device that is essentially a complete, yet miniaturized, xerographic development system. The developer 624, which in the present instance desirably comprises a clear light scattering (and hence low infrared absorbing) toner and carrier beads, is retained in small troughs 620 and 621 at either side of the selenium-surfaced xerographic plates 62. The trough 620 is seen to be somewhat larger in volume than 621, and it will be noted that its bottom portion 630 extends somewhat below the plane of plate 62. As shown in FIG. 5B, a cam at 626 is secured to the cassette frame 628 and engages the bar 622 of spring actuated closure 623 whenever the cassette 68 is within the frame 628. The closure 623 is thus in an open position whenever the cassette is mounted in the display system but closes on such occasions as the cassette is removed—e.g., for refilling, service, etc.—in order to avoid spillage or contamination.

Figure 5A:
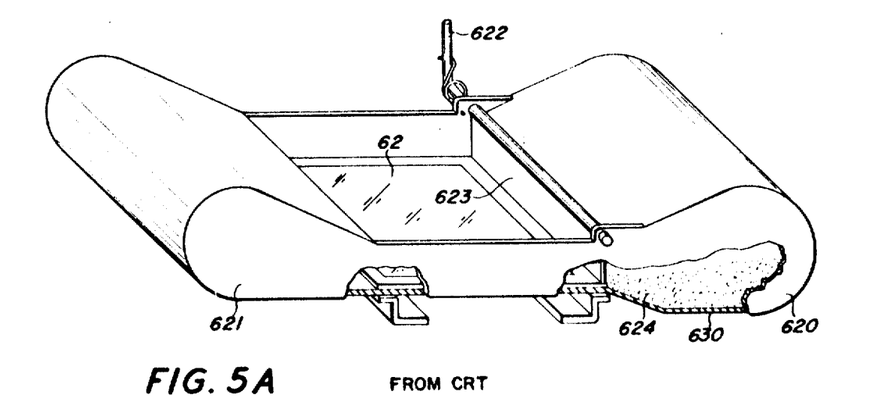
FIGURE 5 is a detailed diagrammatic illustration of the development cassette.
Figure 5B:
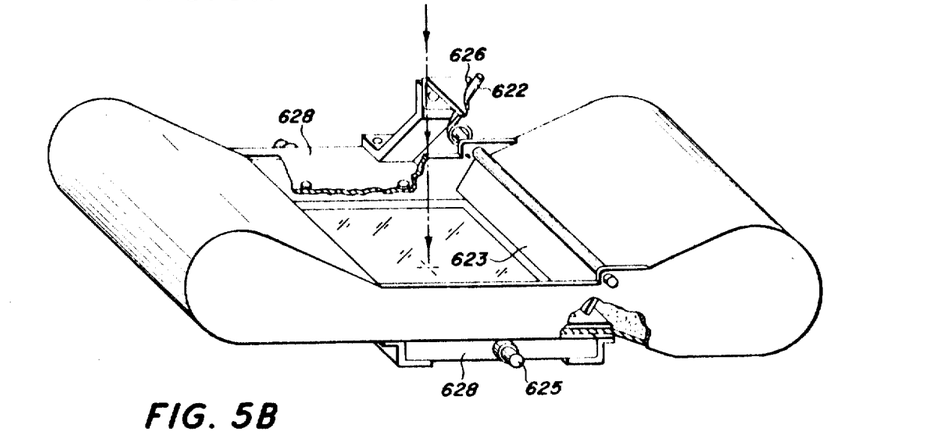
Figure 5C:
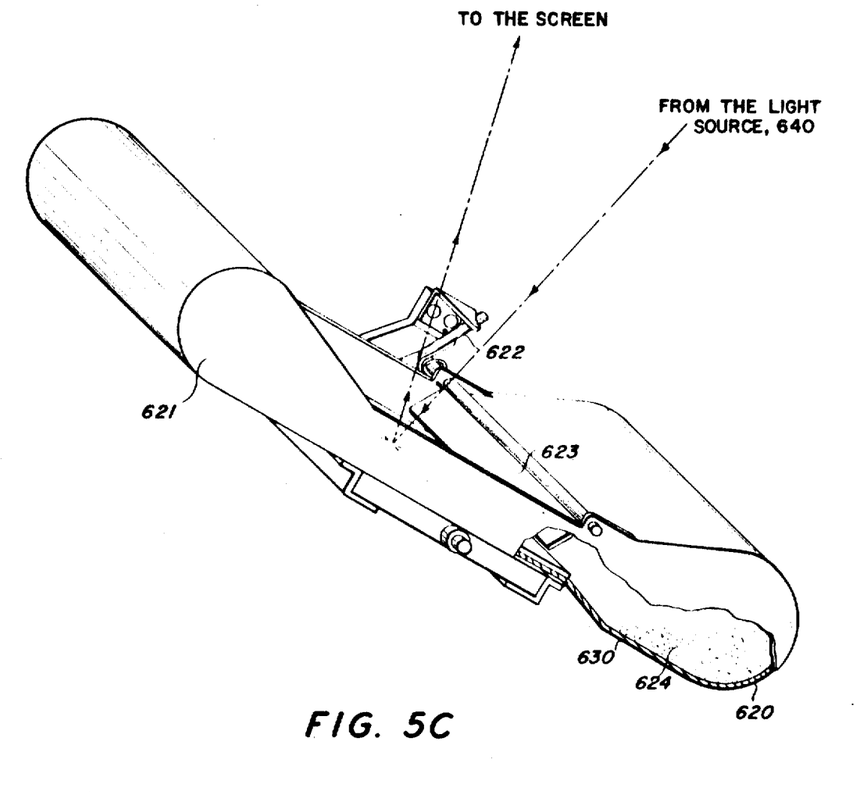

As is shown in FIGS. 5(A), 5(B), and 5(C) the cassette frame 628 is mounted about a transverse axis 625 so that it may undergo oscillation to the extent of approximately ±30 degrees about such axis. Motor driven oscillating means are provided at 681 (FIG. 3) which act through cam 682, roller 683, and linkage 684 to controllably oscillate frame 628 in response to signals emanating from developing process unit 15 (FIG. 1). The latter in turn may be seen to be activated by digital commands routed to it from input router 52. During the imaging process the cassette as shown in FIGURE 3 and in FIGURE 5(B) remains in an essentially horizontal position with the developer gravitationally retained in the deeper trough 620. As previously indicated the portion 630 thereof is sufficiently depressed to assume that toner will not spill over onto the plate 62 during imaging. Upon completion of the imaging process, the cassette is oscillated about this axis by a rocking means so that developer 624 particles from the end storage troughs 620 and 621 cascade over the latent electrostatic image and thereby produce a physical light scattering toner image.

When the development cycle is complete the cassette is stopped in the projection position—that is at approximately 30 degrees from its normal horizontal position, and with the deep trough 620 depressed. Projection then takes place as is shown in the pictorial representation of FIGURE 4 and also in the detailed showing of FIG. 5(C). Here we see the light source 640 passing through the condensing lens 641, and via mirror 642 obliquely illuminating the developed image on xerographic plate 62 within cassette 68. The specularly reflected light then passes via objective lens 643 and mirrors 644 and 645 to the viewing screen 646. Because the clear toner used in developing the latent image scatters light incident upon it, specular reflection reaches the screen only from the non-imaged areas. Accordingly, an image appears at the screen 646 wherein imaged areas—such as would correspond to writing, graphics or the like—appear black and background non-imaged areas appear white. This it may be noted is identical to the customary form in which such material is viewed on paper or the like, and is quite distinct from results achieved with other commonly utilized electronic display devices.

The display present upon the surface of the xerographic plate and at the viewing screen 646 may of course be retained indefinitely. However, under control of developing process unit 15 erasure may be simply accomplished merely by flooding the xerographic plate with light so as to render it totally conductive, and simultaneously oscillating the cassette in the same manner as has been described for development whereby the cascading developer particles will frictionally effect full erasure of the imaged areas. Thereafter, the plate may be resensitized for initiation of a new cycle of write, display, etc. It may be noted in this connection that no attempt has been made in the present description to set forth complete details of the charging mechanism 69 utilized in the present system to sensitize the xerographic plates 62. These details have been omitted as the charge sensitization techniques of xerography are considered to be so fully described elsewhere and otherwise well known as to be apparent to those skilled in this art.

It will probably be evident to those skilled in the art that the vectored point of light established on the face of CRT 61 need not necessarily be rendered as a display to the viewer in the precise manner just described. Thus, for example, instead of utilizing a sensitized xerographic plate and PROXI display system with a CRT of the type indicated, the CRT tube could instead be of the storage type, in which case the vectored image could be presented directly to a viewer at the tube face itself.

While the present invention has been particularly described in terms of a specific embodiment thereof, it will be understood that in view of the foregoing specification numerous deviations therefrom and modifications thereupon may be readily devised by those skilled in the art without yet departing from the present teaching. Thus, for example, while the present invention has been particularly described in connection with its conjunctive use with a remote computer, it will be evident that the system could be used as well to form displays in close proximity to the computer, and that in such instances the data flow rate could be considerably higher than the exemplary values cited where intervening telephone lines appear.

What is claimed is:

1. A data display system for communication with a remote telephone line-linked diigtal computer comprising:
 (a) cathode ray tube display means;
 (b) keyboard and encoding means for generating inquiry data for transmission to said computer;
 (c) vector plotting means electrically connected to the deflection circuitry of said cathode ray tube display means and adapted to receive digitally encoded data from said computer representative of the planar coordinates of a graphic representation, said vector-plotting means including circuitry for establishing and moving the light spot of said CRT display means in accordance with the said planar coordinates digitally transmitted from said central computer;
 (d) data interface means electrically positioned and adapted to link said system to said telephone line, said data interface means including input router means and input/output register means for routing data from said computer to components of said system and for routing data from said keyboard and encoding means to said computer; and (e) display means adapted to integrate the light emanating from said cathode ray tube, thereby forming a display pattern in accord with the real-time movement of said light spot;

(f) said vector plotting means including:
- up-down counter means adapted to digitally store said coordinate values,
- first digital to analog converter means for converting said stored digital coordinate values to analog voltages,
- coupling means to couple said analog voltages to the deflection circuitry of said cathode ray tube display means whereby said light spot on the face of said cathode ray tube may be positioned in accordance with the values of said coordinates,
- register means to store digital signals from said computer indicative of incremental changes in said coordinates,
- second digital to analog converter means having reference voltage inputs, digital inputs and analog outputs being electrically connected to said register means, said converter means being adapted for converting said digital signals presented at said digital inputs to corresponding analog voltage signals at said outputs indicative of said incremental changes in said coordinates,
- third digital to analog converter means having reference voltage inputs and digital inputs, said reference voltage inputs being electrically connected to the outputs of said second digital to analog converter means, said digital inputs being connected in parallel with a digital counter means adapted to increase the analog voltages present at the outputs of said means in discrete equal incremental steps corresponding to the discrete successive intregal states of the counter to the full value corresponding to the reference voltages at the said reference voltage inputs of said third converter means, the outputs of said third converter means being connected to said coupling means,
- and logic means for adding the contents of said register means to said up-down counter means upon the output voltages of said third converter means reaching the said full value of voltages at the said reference voltage inputs of said means, said logic means further being adapted to simultaneously return said digital counter means to a zero condition, whereby the light spot on said CRT display means moves from a position corresponding to coordinate values present at a first time in the said up-down counter means to a position at a later time corresponding to the original coordinate positions plus the variation introduced by said incremental changes in coordinates, in discrete equal position changes of number corresponding to the total discrete states possible in said digital counter means.

2. Apparatus according to claim 1 in which said display means comprises a xerographic display system including a xerographic plate, charge sensitization means for said plate, developing and erasure means, a viewing screen, reflection optics means including a light source for projecting developed images on said xerographic plate to a viewing screen, and optical means for imaging the light pattern on said cathode ray tube means upon said xerographic plate when said plate is in a charge sensitized condition whereby a latent electrostatic image may be formed upon said plate for subsequent development and display.

3. Apparatus according to claim 2 in which said display system is controlled by electrical signals from said computer routed by said input router to said display system.

4. A data display system for communication with a digital computer, comprising:

vector plotting means electrically connected to the deflection circuitry of a cathode ray tube display means and adapted to receive digitally encoded data from said computer representative of the coordinates of points on a graphic representation, said vector-plotting means including circuitry for establishing and moving the light spot of said CRT display means in accordance with the coordinate data digitally transmitted from said computer, said display means including provision for forming a record of the integrated movement of said light spot; and data interface means electrically positioned and adapted to link said system to said computer, said vector plotting means including:
- up-down counter means adapted to digitally store said coordinate values,
- first digital to analog converter means for converting said stored digital coordinate values to analog voltages,
- coupling means to couple said analog voltages to the deflection circuitry of said cathode ray tube display means whereby said light spot on the face of said cathode ray tube may be positioned in accordance with the values of said coordinates,
- register means to store digital signals from said computer indicative of incremental changes in said coordinates,
- second digital to analog converter means having reference voltage inputs, digital inputs and analog outputs, said digital inputs being electrically connected to said register means, said converter means being adapted for converting said digital signals presented at said digital inputs to corresponding analog voltage signals at said outputs indicative of said incremental changes in said coordinates,
- third digital to analog converter means having reference voltage inputs and digital inputs, said reference voltage inputs being electrically connected to the outputs of said second digital to analog converter means, said digital inputs being connected in parallel with a digital counter means adapted to increase the analog voltages present at the outputs of said means in discrete equal incremental steps corresponding to the discrete successive intregal states of the counter to the full value corresponding to the reference voltages at the said reference voltage inputs of said third converter means, the outputs of said third converter means being connected to said coupling means,
- and logic means for adding the contents of said register means to said up-down counter means upon the output voltages of said third converter means reaching the said full value of voltages at the said reference voltage inputs of said means, said logic means further being adapted to simultaneously return said digital counter means to a zero condition, whereby the light spot on said CRT display means moves from a position corresponding to coordinate values present at a first time in the said up-down counter means to a position at a later time corresponding to the original coordinate positions plus the variation introduced by said incremental changes in coordinates, in discrete equal position changes of number corresponding to the total discrete states possible in said digital counter means.

5. A vector plotter adapted to position a light spot on a cathode ray tube in accordance with digitally furnished initial coordinate data and thereafter move the light spot to a new position in accord with digitally furnished coordinate change data in discrete and equal linear steps comprising:
(a) deflection means for said cathode ray tube;
(b) up-down counter means for said initial coordinate data;
(c) first digital to analog converter means electrically connected to said deflection means for positioning and holding said spot at a point on said cathode ray tube corresponding to said initial coordinate data in said up-down counter means;
(d) register means for storing digital coordinate change data subsequently furnished;
(e) second digital to analog converter means electrically connected to said deflection means and to said register means, said second converter means being adapted to provide an analog signal rising in equal discrete steps from zero to a full value determined by said digital coordinate change data, whereby the cathode ray tube spot is moved in discrete equal linear steps to a new position defined by the initial coordinate data plus the coordinate change data; and
(f) means to subsequently add the contents of said register means to said up-down counter means.

6. A vector plotter adapted to position a cathode ray beam in a cathode ray tube in accordance with digital initial coordinate data and thereafter to reposition the beam in accordance with digital coordinate change data in discrete and equal steps comprising:
(a) an input terminal adapted to receive digital initial coordinate and coordinate change data;
(b) deflection means associated with said cathode ray tube for deflecting said beam in response to analog deflection signals;
(c) up-down counter means coupled to said input terminal for receiving said initial coordinate data therefrom;
(d) initial coordinate converter means coupled to said deflection means for generating initial analog deflection signals representative of said initial coordinate data received by said counter means;
(e) register means coupled to said input terminal for receiving coordinate change data therefrom;
(f) digital to analog converter means coupled to said deflection means for generating a series of incremental analog deflection signals, each one of said incremental analog singals differing from adjacent incremental analog signals by an equal amount, said series of incremental analog signals incrementing between zero and a value representative of said coordinate change data received by said register; and,
(g) summing means coupled to said deflection means for summing said initial and incremental analog deflection signals.

7. A plotter as defined in claim 6 wherein said digital to analog converter means includes:
(a) a first digital to analog converter means coupled to said register means for developing an analog reference signal representative of said coordinate change data;
(b) counter means having an $2^n-1$ capacity where $n$ is an integral number for counting successive pulses; and
(c) a second digital to analog converter means responsive to said analog reference signal and the condition of said counter means for generating said series of incremental analog deflection signals as the condition of said counter means changes, each of said incremental analog deflection signals being proportional to $(\frac{1}{2}^n-1)$ of said analog reference signal.

References Cited

UNITED STATES PATENTS

| | | | |
|---|---|---|---|
| 3,325,802 | 6/1967 | Bacon | 340—324.1 |
| 3,323,119 | 5/1967 | Barcomb et al. | 340—172.5 |
| 3,320,409 | 5/1967 | Larrowe | 340—324.1 |
| 3,278,683 | 10/1966 | Ashby et al. | 346—74 |

OTHER REFERENCES

"Xerography and Related Processes," Dessaver & Clark, Focal Press 1965, pages 382–3 and 482 relied on. (Scientific Library TR470D47.)

ROBERT L. GRIFFIN, Primary Examiner

J. A. BRODSKY, Assistant Examiner

U.S. Cl. X.R.

340—172.5, 324; 346—74